United States Patent
Lei-Jui

Patent Number: 5,901,946
Date of Patent: May 11, 1999

[54] BALL VALVE SEAT

[76] Inventor: Wu Lei-Jui, No. 13, Fang Yuan Hsiang, Hou Liao Tsun, Kung Chu 4 Road, Chang Hua Hsien, Taiwan

[21] Appl. No.: 09/074,378

[22] Filed: May 8, 1998

[51] Int. Cl.$^6$ ....................................................... F16K 5/06
[52] U.S. Cl. ................................. 251/315.14; 251/315.15
[58] Field of Search ........................... 251/315.14, 315.15

[56] References Cited

U.S. PATENT DOCUMENTS

| | | | |
|---|---|---|---|
| 4,054,262 | 10/1977 | Laignel et al. | 251/315.14 X |
| 4,523,740 | 6/1985 | Patchell | 251/315.14 X |

*Primary Examiner*—John Fox
*Attorney, Agent, or Firm*—Bacon & Thomas, PLLC

[57] ABSTRACT

An improved ball valve seat including a ball valve seat body which includes a water intake connector, a ball valve seat, a limiting seat, and a water outlet seat, all of which are formed by forging. The water intake connector is provided with a through water intake hole having a first flared portion at a rear end thereof, an outer threaded portion, and a stop rim behind the outer threaded portion. The ball valve seat includes a ball valve chamber, an inner stepped hole at a rear end of the ball valve chamber, and a connecting opening with an inner threaded portion at a front end of the ball valve chamber. The limiting seat includes a through communication hole with a second flared portion at a front end thereof, and an inner threaded portion at a rear end thereof. The water outlet seat is centrally provided with a through hole having a third flared portion at a front end thereof, an outer threaded portion near the front end of the water outlet seat, and a stop rim behind the outer threaded portion. When the inner threaded portion of the ball valve seat engages the outer threaded portion of the connector head of the water intake connector, the connecting opening of the ball valve seat will urge against the stop rim of the water intake connector and be positioned.

1 Claim, 3 Drawing Sheets

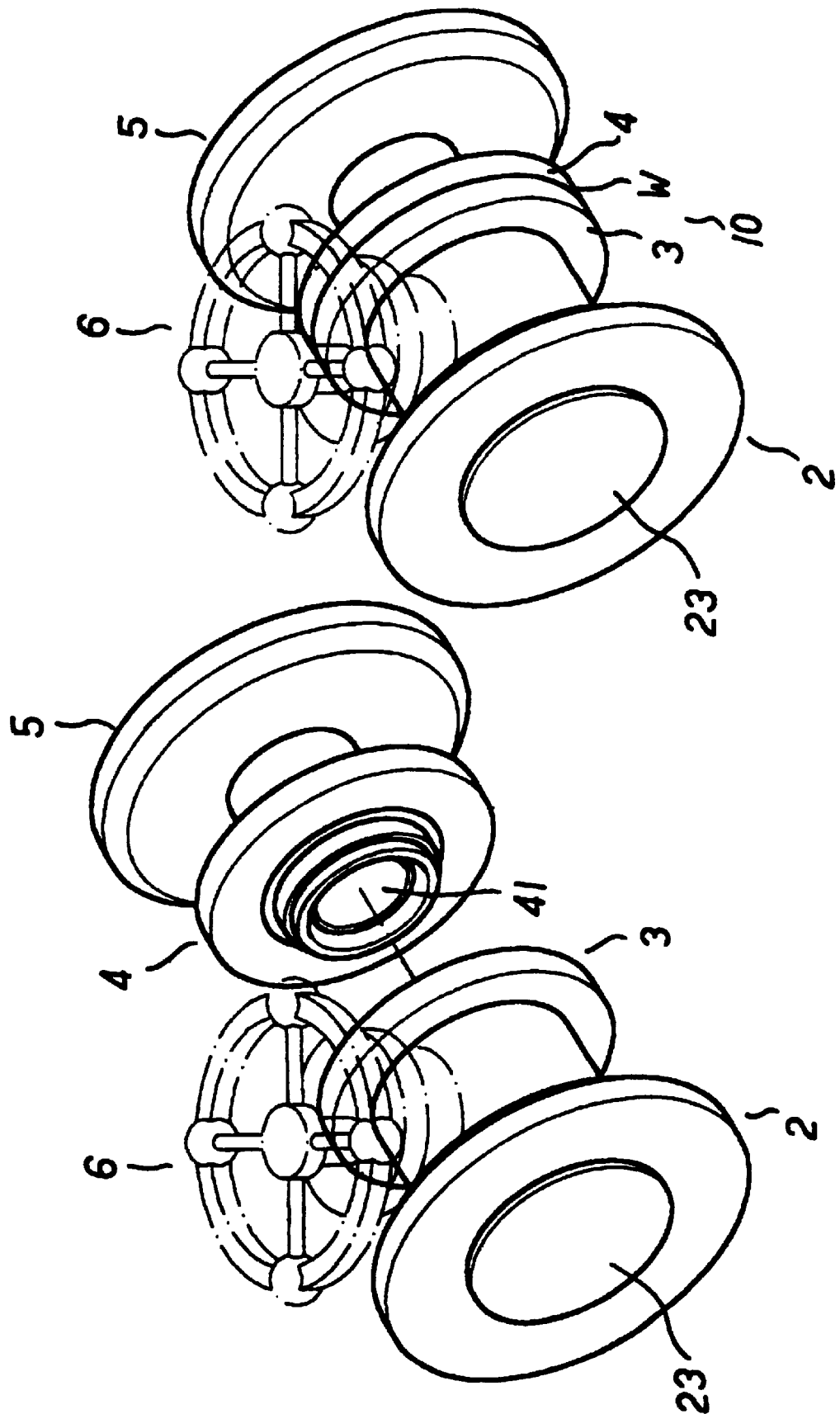

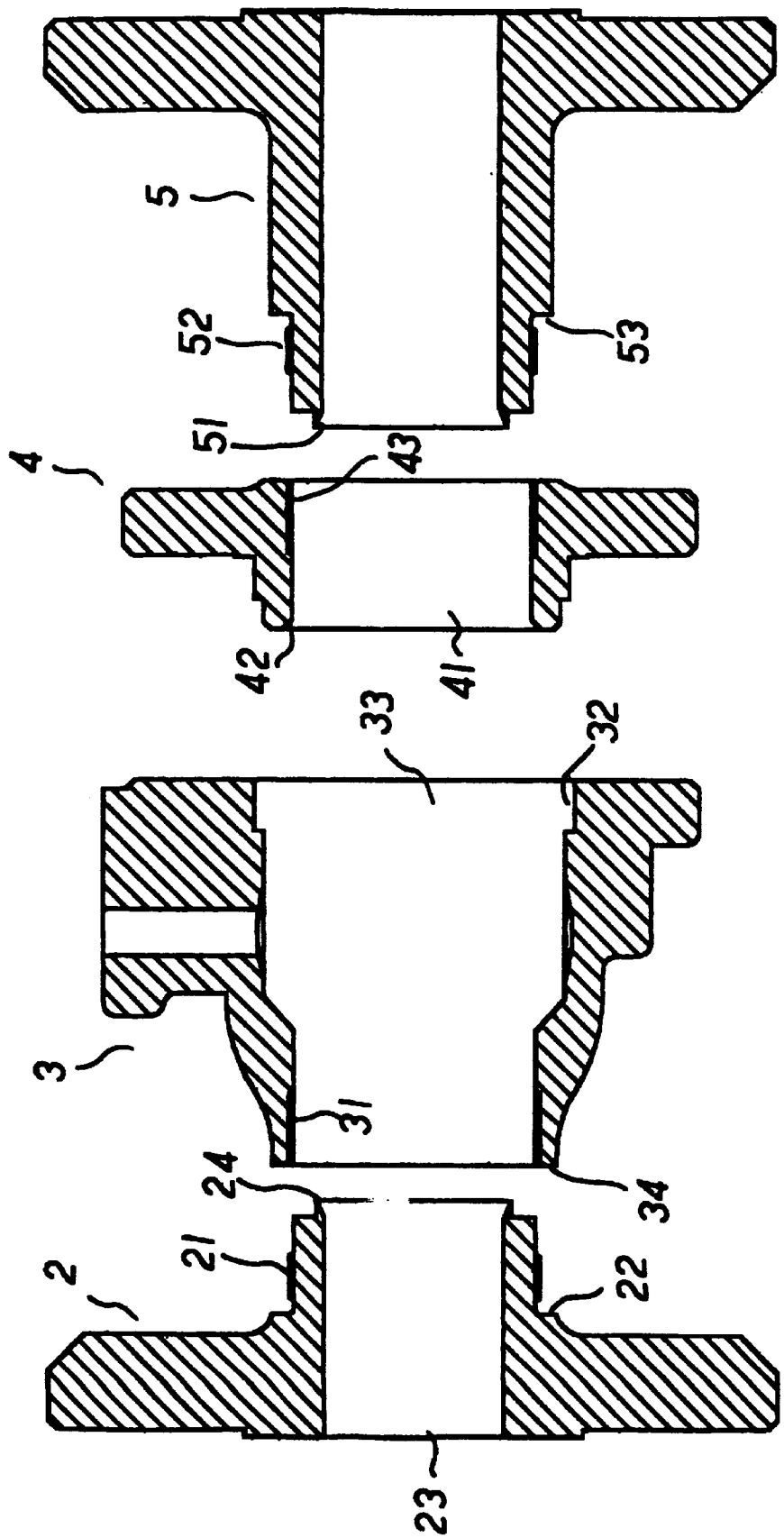
FIG1-A
FIG1-B

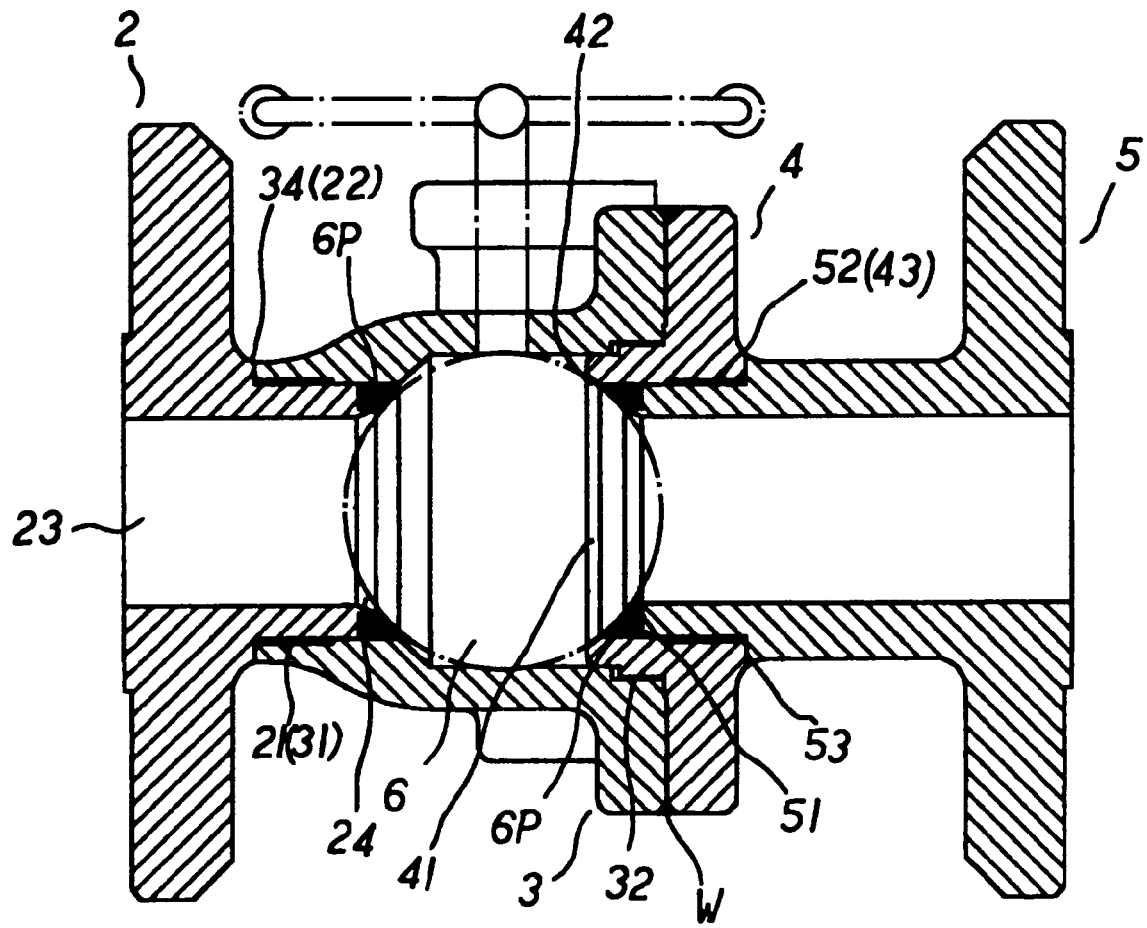
FIG2-A

BALL VALVE SEAT

BACKGROUND OF THE INVENTION (a) Field of the Invention

The present invention relates generally to an improved ball valve seat, and more particularly to a ball valve seat the components of which are forged and all the joining surfaces are welded to avoid leakage and achieve an integral ball valve.

(b) Description of the Prior Art

Conventional ball valve seats are generally made of metal and are cast in shape. As casting of ball valve seats requires skill, labor is expensive and hard to find.

Furthermore, cast ball valve seats may have pores in the walls and cannot be utilizable. If they are used, there will be serious leakage problems.

SUMMARY OF THE INVENTION

A primary object of the present invention is to provide an improved ball valve body, the components of which are formed by forging to reduce porosity, ensure good quality, and allow automation of machining.

BRIEF DESCRIPTION OF THE DRAWINGS

The foregoing and other features and advantages of the present invention will be more clearly understood from the following detailed description and the accompanying drawings, in which, FIG. 1 is a schematic assembled view of the present invention;

FIG. 1A is a sectional schematic view of the water intake parts of the present invention;

FIG. 1B is a sectional schematic view of the water outlet parts of the present invention;

FIG. 2 is a schematic view of the present invention after assembly; and

FIG. 2A is a sectional view of the present invention after assembly.

DETAILED DESCRIPTION OF THE PREFERRED EMBODIMENT

With reference to FIGS. 1, 1A, and 1B, the present invention comprises a ball valve seat body 10 which includes a water intake connector 2, a ball valve seat 3, a limiting seat 4, and a water outlet seat 5. All of the elements are forged in shape, processed and then assembled together.

The water intake connector 2 is provided with a through water intake hole 23 at the center thereof, a first flared portion 24 at a rear end of the water intake hole 23, an outer threaded portion 21 on a connector head thereof near the rear end of the water intake connector 2, and a stop rim 22 behind the outer threaded portion 21.

The ball valve seat 3 includes a ball valve chamber 33 at a center thereof, an inner stepped hole 32 disposed at a rear end of the ball valve chamber 33 and communicating with the ball valve chamber 33, a connecting opening 34 at a front end of the ball valve chamber 33, and an inner threaded portion 31 disposed at the connecting opening 34.

The limiting seat 4 includes a through communication hole 41, a second flared portion 42 at a front end of the communication hole 41, and an inner threaded portion 43 at a rear end of the communication hole 41.

The water outlet seat 5 is centrally provided with a through hole and includes a third flared portion 51 at a front end of the through hole, an outer threaded portion 52 near the front end of the water outlet seat 5, and a stop rim 53 behind the outer threaded portion 52.

When the inner threaded portion 31 of the ball valve seat 3 engages the outer threaded portion 21 of the connector head of the water intake connector 2, the connecting opening 34 of the ball valve seat 3 will urge against the stop rim 22 of the water intake connector 2 and be positioned. When a ball valve 6 is insertably fitted into the ball valve chamber 33 along with a washer 6P, it will abut the first flared portion 24 of the water intake connector 24 and be positioned.

With further reference to FIGS. 2 and 2A, the outer threaded portion 52 of the water outlet seat 5 engages the inner threaded portion 43 of the limiting seat 4 such that the stop rim 53 urges against a face rim of the limiting seat 4, and a washer 6P attached to the third flared portion 51 also urges against the ball valve 6. Welding W (or friction welding) is applied to the joining surfaces to ensure that there are no gaps. In addition, a fixing agent may be applied to where the threaded portions engage to achieve an integral ball valve seat body 10. Furthermore, the contact surfaces inside may achieve even and tight threaded engagement to avoid leakage.

In summary, since all the components of the present invention are formed by forging, the present invention is able to effectively eliminate drawbacks with conventional cast components. Besides, forged components may allow excellent automation of machining processes to enhance production and facilitate quality control.

Although the present invention has been illustrated and described with reference to the preferred embodiment thereof, it should be understood that it is in no way limited to the details of such embodiment but is capable of numerous modifications within the scope of the appended claims.

What is claimed is:

1. An improved ball valve seat, comprising a ball valve body, which includes:

a water intake connector provided with a through water intake hole at a center thereof, a first flared portion at a rear end of said water intake hole, an outer threaded portion on a connector head thereof near the rear end of said water intake connector, and a stop rim behind said outer threaded portion;

a ball valve seat including a ball valve chamber at a center thereof, an inner stepped hole disposed at a rear end of said ball valve chamber and communicating with said ball valve chamber, a connecting opening at a front end of said ball valve chamber, and an inner threaded portion disposed at said connecting opening;

a limiting seat including a through communication hole, a second flared portion at a front end of said communication hole, and an inner threaded portion at a rear end of said communication hole; and a water outlet seat being centrally provided with a through hole and including a third flared portion at a front end of said through hole, an outer threaded portion near the front end of said water outlet seat, and a stop rim behind said outer threaded portion, whereby when said inner threaded portion of said ball valve seat engages said outer threaded portion of said connector head of said water intake connector, said connecting opening of said ball valve seat will urge against said stop rim of said water intake connector and be positioned, and a ball valve insertably fitted into said ball valve chamber will abut said first flared portion of said water intake connector and be positioned; and when said outer threaded portion of said water outlet seat engages said inner threaded portion of said limiting seat such that said stop rim urges against a face rim of said limiting seat, and said third flared portion also urges against said ball valve, welding being applied to the joining surfaces to ensure that there are no gaps to thereby achieve an integral ball valve body.

* * * * *